(12) United States Patent
Misumi

(10) Patent No.: US 7,463,386 B2
(45) Date of Patent: Dec. 9, 2008

(54) COLOR PROCESSING DEVICE AND ITS METHOD

(75) Inventor: Mizue Misumi, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 334 days.

(21) Appl. No.: 11/275,833

(22) Filed: Jan. 31, 2006

(65) Prior Publication Data

US 2006/0170939 A1    Aug. 3, 2006

(30) Foreign Application Priority Data

Feb. 2, 2005    (JP)    ............... 2005-026882

(51) Int. Cl.
G06F 15/00    (2006.01)
G06K 1/00    (2006.01)
H04N 1/60    (2006.01)
G09G 5/02    (2006.01)

(52) U.S. Cl. ........................ 358/1.9; 345/590

(58) Field of Classification Search ............ 358/1.9
See application file for complete search history.

(56) References Cited

U.S. PATENT DOCUMENTS 7,126,718 B1    10/2006    Newman et al. ............. 358/1.9

2002/0000993 A1*    1/2002    Deishi et al. ................ 345/590
2003/0184779 A1*    10/2003    Ohga ........................ 358/1.9

FOREIGN PATENT DOCUMENTS

JP    2004-213317    7/2004

* cited by examiner

Primary Examiner—Mark Zimmerman
Assistant Examiner—Fan Zhang
(74) Attorney, Agent, or Firm—Fitzpatrick, Cella, Harper & Scinto

(57) ABSTRACT

In order to implement color matching between different printers upon proofing or the like, color processing that absorbs not only a difference between gamuts but also differences among white, black, and a gray line is provided. Two pieces of gamut information of an appearance color space of first and second image devices are acquired. The color signals on a gray line of each gamut information are converted into those on a lightness axis of the appearance color space. A gamut indicated by the gamut information of the first image device is mapped within a gamut indicated by the gamut information of the second image device. Color signals after mapping, which correspond to a gray line of the first image device, are converted into gray color signals according to white and black indicated by the gamut information of the second image device.

7 Claims, 20 Drawing Sheets

COLOR PROCESSING DEVICE AND ITS METHOD

FIELD OF THE INVENTION

The present invention relates to a color processing device and its method and, more particularly, to mapping between different gamuts.

BACKGROUND OF THE INVENTION

Along with the popularization of digital cameras and scanners and the like, users have many opportunities to output and appreciate images printed using printers and to save them, and demand for the ability to output images with favorable colors is increasing.

Color image devices have different gamuts of color reproduction depending on their characteristics. Hence, it is conventionally known to perform conversion (color matching) in an effort to provide uniform color appearance of an image as between different devices.

When an image device B has a broader gamut than that of an image device A, image device B can faithfully reproduce the colors of image device A. However, when an image device D has a gamut narrower than that of an image device C, as in a case wherein a color image displayed on a monitor is to be output by a printer, image device D cannot faithfully reproduce the colors of image device C.

That is, the gamut of equipment such as a monitor and the gamut of another type of equipment such as a printer are different. Also, the gamuts of printers are different in accordance with printing conditions such as printing method, kind of paper, printing materials (inks or toners) and the like.

In order to suppress a drop in color reproducibility due to a difference between input and output gamuts, color matching requires gamut mapping as processing for mapping an input color within an output gamut while maintaining its tint as much as possible.

As gamut mapping, various methods have been proposed.

For example, a method that maps input color within an output gamut to minimize a color difference has been proposed.

This gamut mapping can obtain a satisfactory color matching result in middle and high saturation ranges upon comparing between images before and after mapping. However, this gamut mapping often gives an unnatural impression as a whole. This is because such gamut mapping does not consider differences of white (R, G, B)=(255, 255, 255) and black (R, G, B)=(0, 0, 0) and a gray line that connects white and back of the input and output gamuts, since it attaches importance on only absorption of a to color differences between the input and output gamuts.

In printed matter, the white normally depends on that of paper, and the black depends on the color of a color former such as ink, toner, and the like. In this way, white and black, and a gray line that connects them depend on the characteristics of devices.

FIG. 1 shows a gamut 1001 of a monitor, a gamut 1002 of a printer, a gray line 1003 of the monitor, and a gray line 1004 of the printer on a lightness L*-saturation C* plane of a CIELAB space. FIG. 2 shows gamuts 1011 and 1012, and gray lines 1013 and 1014 of different print sheets in the lightness L*-saturation C* plane of the CIELAB space.

As shown in FIGS. 1 and 2, not only gamuts but also gray lines differ depending on devices to be used or the types of print sheets to be used. Especially, the gray line determines the tint of the entire image. For example, in order to implement color matching between different printers upon, e.g., proofing, color processing that absorbs not only a difference between gamuts but also differences of white, black, and a gray line is required.

SUMMARY OF THE INVENTION

According to the first aspect of the present invention, a color processing method of mapping an input color within a first gamut to an output color within a second gamut, comprising the steps of: acquiring gamut information of the first gamut and the second gamut; converting color signals on and in the neighborhood of gray lines of the first gamut and the second gamut into color signals on and in the neighborhood of an achromatic axis; mapping the converted first gamut within the converted second gamut; and converting the color signals on and in the neighborhood of the achromatic axis after mapping into color signals on and in the neighborhood of a gray line based on white and black of the second gamut, is disclosed.

According to the present invention, color processing which considers of a difference between gray lines of different gamuts is provided. Further, according to the present invention, implement reproduction of the tint demanded by the user in an arbitrary image output environment is easy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will now be described in detail in accordance with the accompanying drawings.

First Embodiment

[Device Arrangement]

Figure 1:
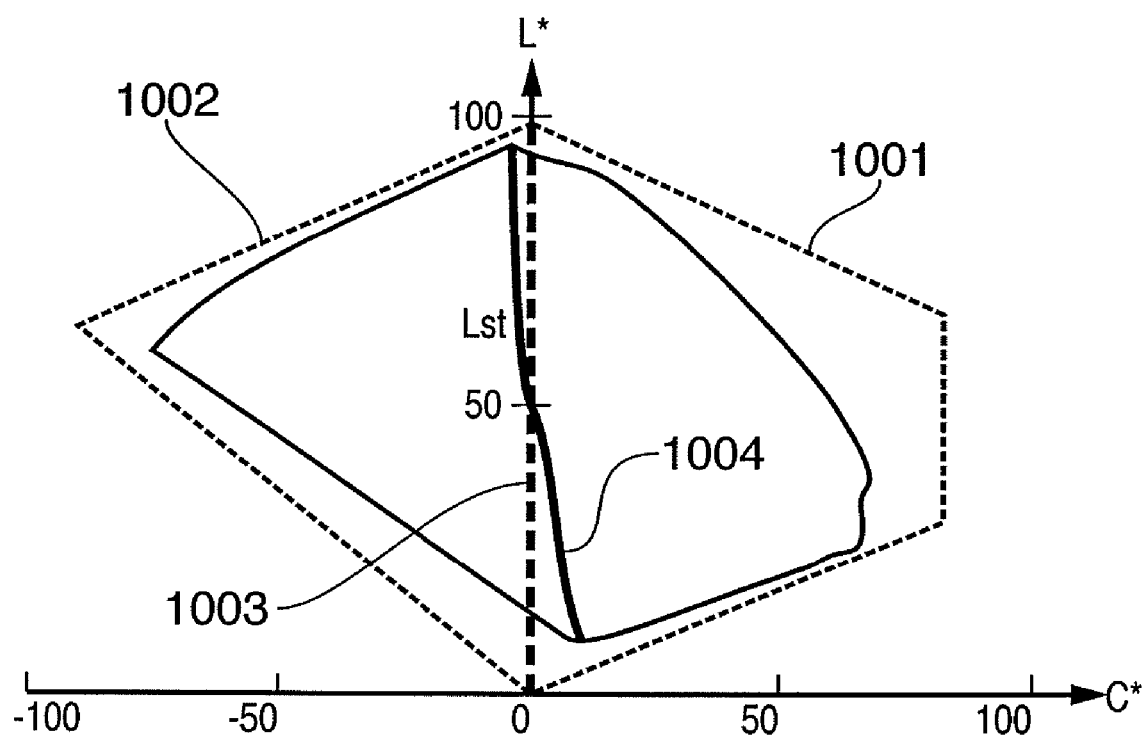
FIG. 1 shows the gamuts of a monitor and printer, and achromatic axes unique to devices.
Figure 2:
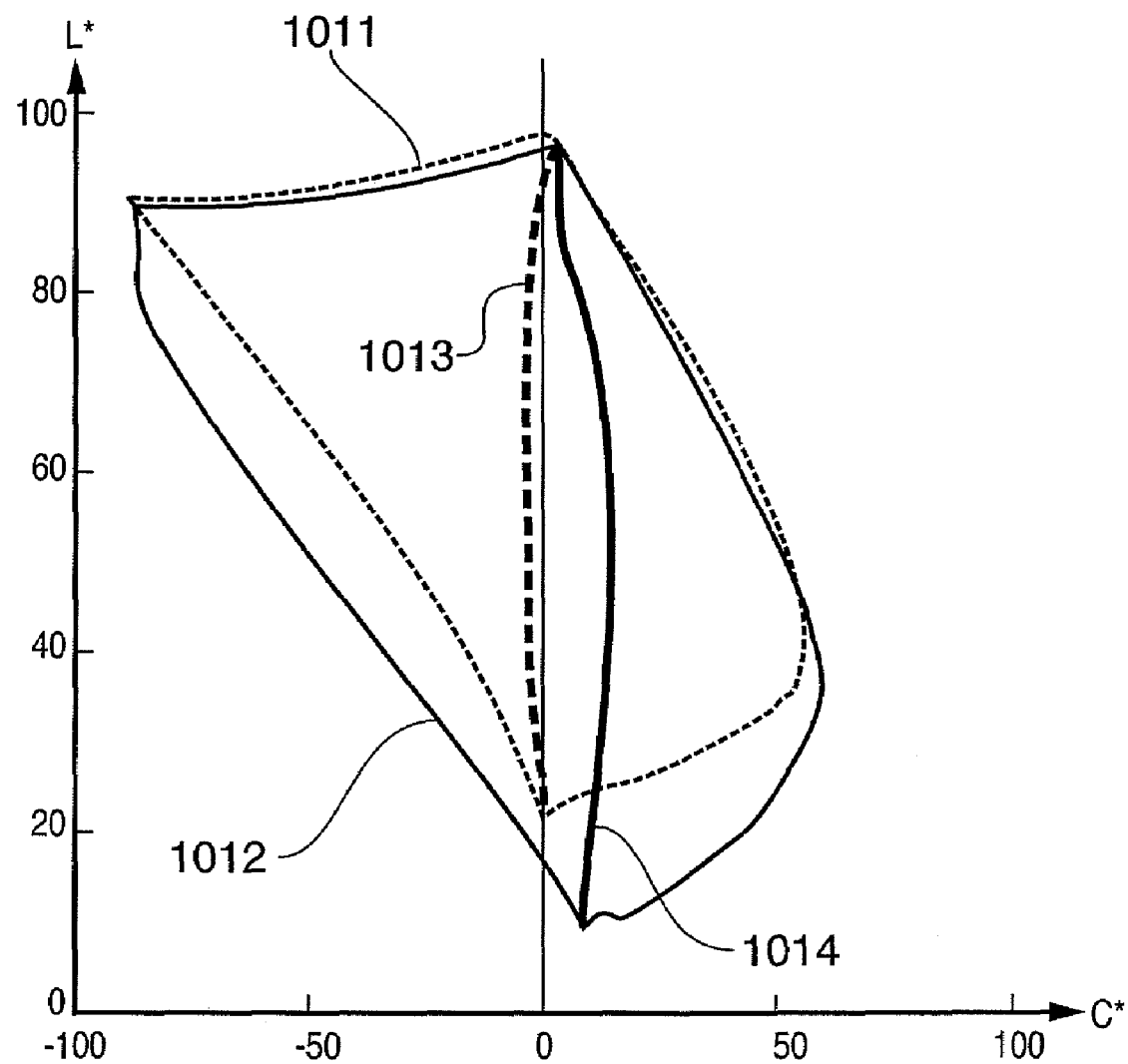
FIG. 2 shows gamuts of different print sheets and different printers, and gray lines unique to these print sheets.
Figure 3:
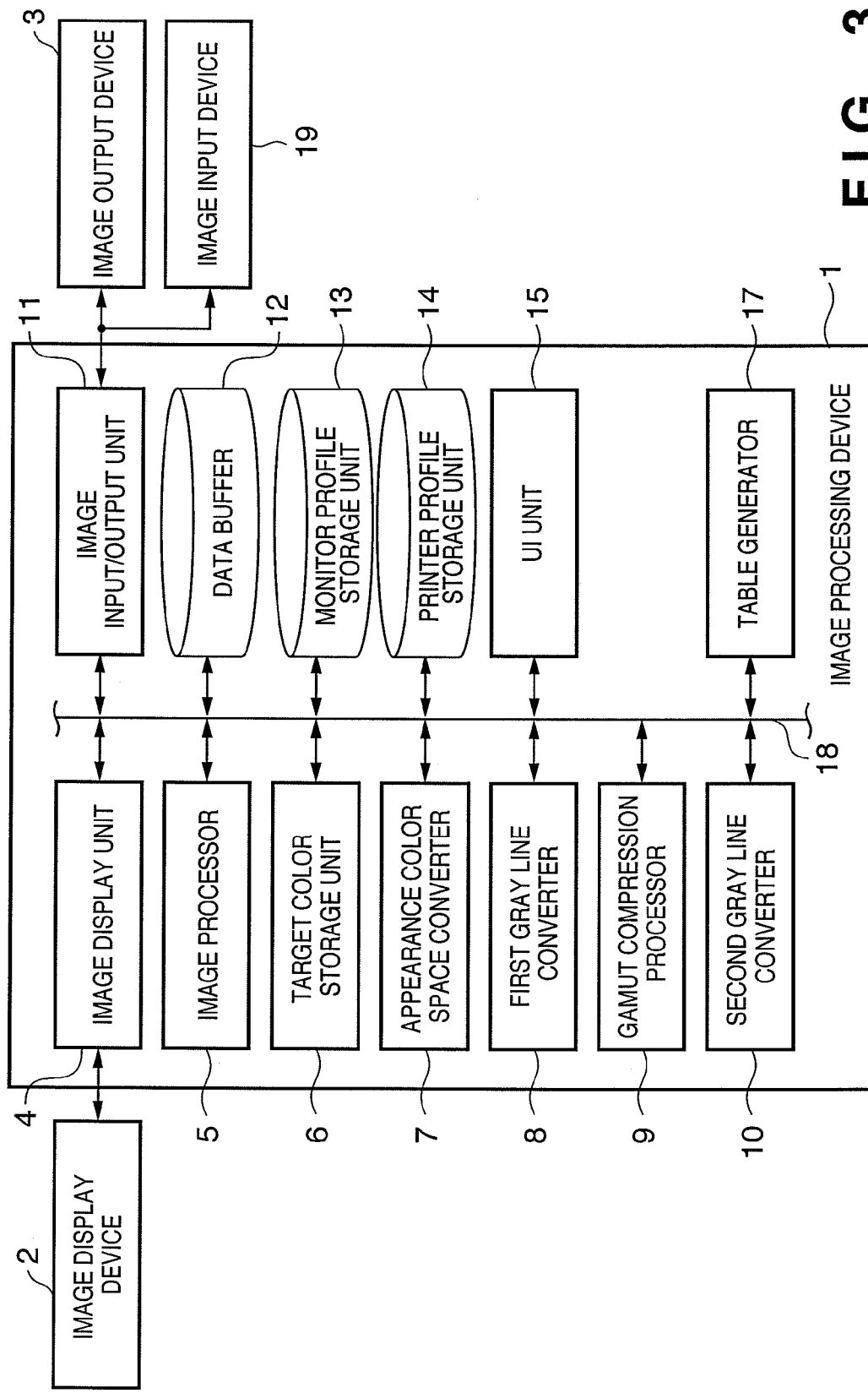
FIG. 3 is a block diagram showing the arrangement of an image processing device according to the first embodiment of the present invention.

FIG. 3 is a block diagram showing the arrangement of an image processing device 1 according to the first embodiment of the present invention.

The image processing device 1 displays an image input from an image input device 19 such as a scanner or the like on an image display device 2 such as a monitor or the like, and outputs an image displayed on the image display device 2 to an image output device 3 such as a printer or the like.

An image display unit 4 generates a signal for displaying an image on the image display device 2. An image processor 5 executes tone conversion processing required to output the color displayed on the image display device 2 to the image output device 3, and the like. A target color storage unit 6 stores color reproduction information of a target printer, i.e., gamut information of the printer as the target of color reproduction.

An appearance color space converter 7 executes processing for converting calorimetric device characteristic data stored in a monitor profile storage unit 13, a printer profile storage unit 14, the target color storage unit 6, and the like onto an appearance color space. Note that the appearance color space is that which does not depend on devices and observation conditions, and the appearance color space converter performs conversion using a color appearance model such as CIECAM97s, CIECAM02, and the like.

A first gray line converter 8 executes processing for converting a gray line unique to each device onto the lightness axis on the color appearance color space.

Note that an example in which the gray line of a device gamut is mapped on the lightness axis of the appearance color space will be described below. However, depending on a color space to be adopted, the gray line may be mapped on a luminance axis. That is, the gray line of the device gamut need only be mapped on an achromatic axis of the color space to be adopted.

A gamut compression processor 9 performs gamut mapping. A second gray line converter 10 converts the gray line on the achromatic axis converted by the first gray line converter into a favorable gray line of an output device. An image input/output unit 11 receives an image signal from the image input device 19 and generates a print image signal to be output to the image output device 3.

A data buffer 12 is a memory which temporarily saves various data including an input image so as to execute data processing, and comprises, e.g., a RAM. The monitor profile storage unit 13 is a memory which stores a monitor profile of the image display device 2 or the like. The printer profile storage unit 14 is a memory which stores a printer profile of the image output device 3 or the like. These storage units 13 and 14 comprise a nonvolatile memory such as a hard disk or the like.

A user interface (UI) unit 15 provides an operation environment of the image processing device 1 to the user by displaying a graphical user interface dialog used to operate the image processing device 1 on, e.g., the image display device 2. A table generator 17 generates a lookup table (LUT) for color matching between a color to be displayed on the image display device 2 and that to be output by the image output device 3.

The above arrangement can be implemented as hardware. Alternatively, the above arrangement can also be implemented by supplying programs (e.g., a printer driver program) used to implement processing to be described later to a CPU that executes an operating system (OS) and programs of various kinds of processing stored in a ROM or hard disk using a RAM as a work memory. In this case, the image display unit 4 may comprise a video card with a graphical processor (GPU), the image input/output unit 11 may comprise an interface card for a serial bus such as USB, IEEE1394, or the like, and the CPU, RAM, ROM, hard disk, video card, and interface card may be connected via a system bus 18.

[Overall Processing]

Figure 4:
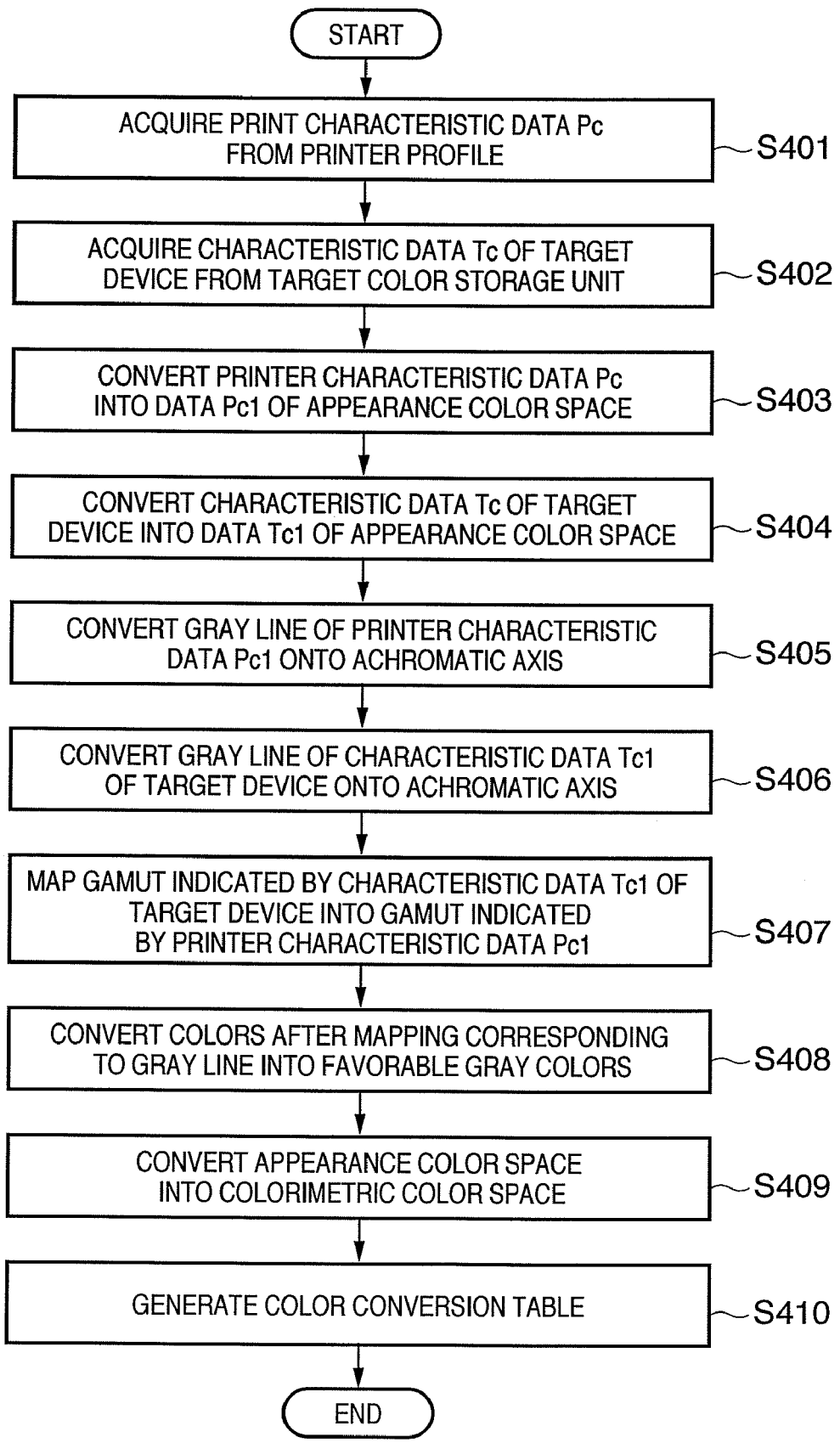
FIG. 4 is a flowchart showing image processing executed by an image processor.

FIG. 4 is a flowchart of image processing to be executed by the image processing device 1. In this embodiment, processing upon execution of color matching between input and output devices will be explained.

The UI unit 15 displays the user interface, and prompts the user to select the types of a printer (image output device 3) and a print sheet (recording medium) for which a color conversion table is to be generated. Then, print characteristic data Pc corresponding to the selected types of the printer and print sheet is acquired from the printer profile storage unit 14 (S401).

The printer characteristic data Pc is data indicating color reproduction characteristics corresponding to a combination of the selected printer and print sheet, and is represented by a correspondence between device-dependent data (e.g., RGB or the like) and calorimetric values (e.g., CIELab). More specifically, patches reproduced on the selected print sheet by the selected printer based on the device-dependent data are measured. Then, the printer characteristic data Pc can be generated by associating device-dependent data with the colorimetric result.

Then, characteristic data Tc of a target device (input device) that represents a target color of color reproduction of the color conversion table is acquired from the target color storage unit 6 (S402). For example, when the target device is a display device, the characteristic data Tc can be generated by the following processing. A plurality of color patches expressed by RGB data are displayed on the display device. The displayed color patches are measured. A table indicating the colorimetric results (e.g., Lab values) and the RGB values is generated. By analyzing this table, gamut information and a gray line of the target device can be obtained.

Next, the appearance color space converter 7 converts colorimetric values of the printer characteristic data Pc into data $Pc_1$ on the appearance color space (S403). Likewise, the appearance color space converter 7 converts colorimetric values of the characteristic data Tc of the target device into data $Tc_1$ on the appearance color space (S404). Color conversion using CIECAM02 as the appearance color space will be exemplified below. However, the present invention is not limited to such specific color space.

The first gray line converter 8 converts a gray line of the printer characteristic data $Pc_1$ onto the lightness axis (achromatic axis) on the CIECAM02 color space to generate printer characteristic data $PC_1'$ (S405).

Likewise, the first gray line converter 8 converts calorimetric values of a gray line of the characteristic data Tc of the target device onto the lightness axis (achromatic axis) on the CIECAM02 color space to generate characteristic data $Tc_1'$ of the target device (S406).

When the characteristic data Pc and Tc are represented by the correspondence between RGB and colorimetric values (e.g., Lab), a line represented by the colorimetric values corresponding to R=G=B serves as a gray line. On the other hand, when characteristic data are represented by the correspondence between CMYK and colorimetric values, a line represented by the calorimetric values corresponding to C=M=Y=0 serves as a gray line.

In this way, the gray lines in steps S405 and S406 are device-dependent gray lines.

The gamut of the printer is calculated from the printer characteristic data $Pc_1'$ generated in step S405, and that of the target device is calculated from the characteristic data $Tc_1'$ of the target device generated in step S406.

The gamut compression processor 9 executes gamut mapping processing for mapping the gamut of the target device onto that of the printer using the gamuts of the printer and target device (S407).

The second gray line converter 10 converts color signals of the gray line of those mapped in step S407 into a favorable gray color of the printer (S408). The favorable gray color of the printer is calculated in accordance with white and black of the printer characteristic data $Pc_1$.

The color signals converted in step S408 are converted from the appearance color space to a colorimetric color space (S409). The colorimetric color space is, for example, a color space such as CIELAB or the like. Finally, using the color signals obtained by the processing up to step S409, a color conversion table is generated (S410).

[Processing for Converting Gray Line of Printer onto Lightness Axis (Achromatic Axis) (S405)]

Figure 5:
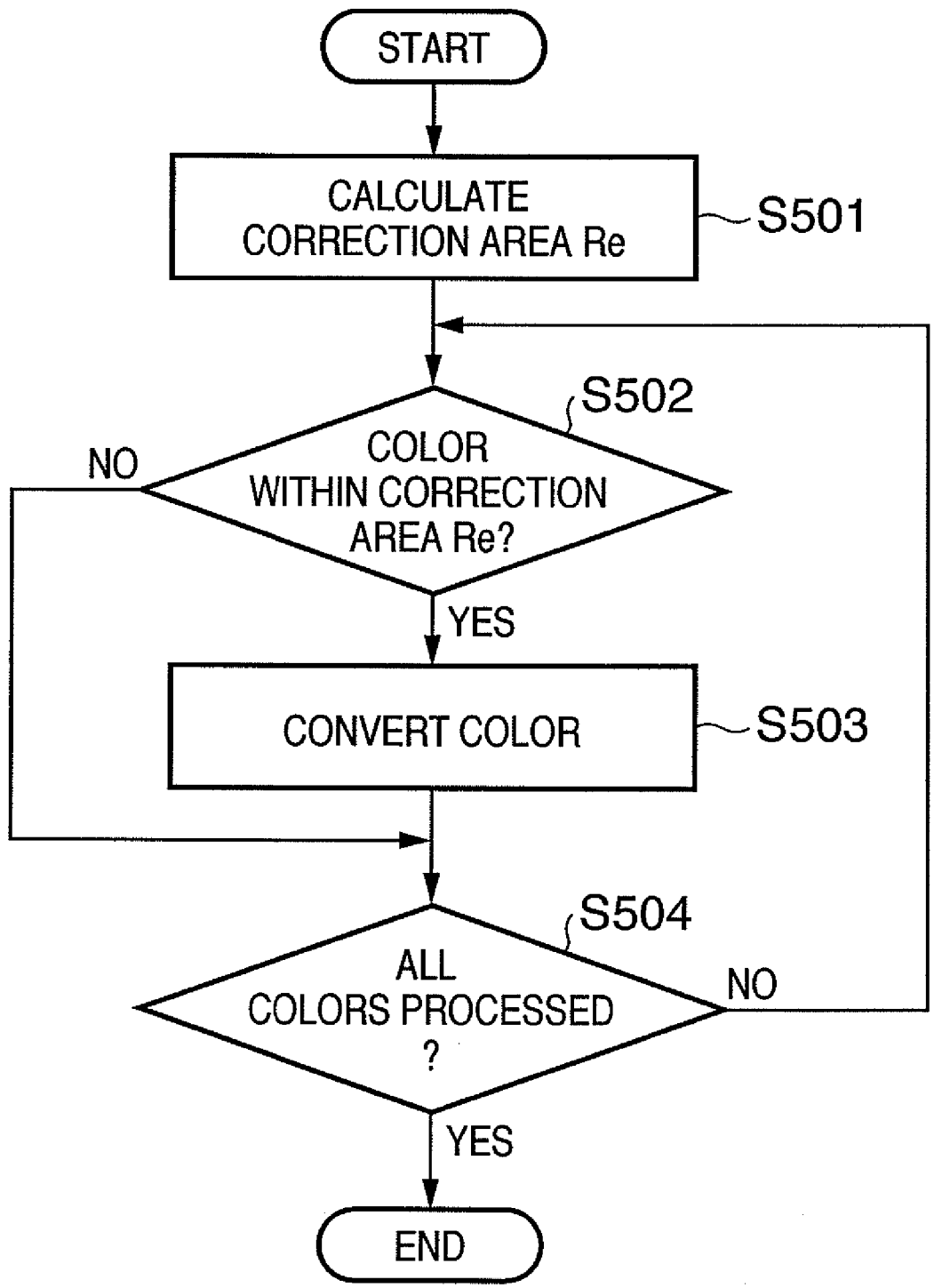
FIG. 5 is a flowchart showing details of processing for converting the gray line of printer characteristics data onto a lightness axis.

FIG. 5 is a flowchart showing details of processing which is executed by the first gray line converter 8 and converts the gray line of the printer characteristic data $Pc_1$ onto the lightness axis (achromatic axis).

Upon converting the gray line of the printer characteristic data $Pc_1$ onto the lightness axis on the CIECAM02 color space, any abrupt change in the gamut of the printer characteristic data by this conversion must be avoided. Hence, in order to convert not only the gray line but also colors around the gray line, a correction area Re is calculated (S501). In this embodiment, on a hue plane of a given lightness value on the CIECAM02 color space shown in FIG. 7, an ellipse that has as its major axis a line segment, which connects a color P1 on the gray line of the printer characteristic data $Pc_1$ and the origin (achromatic color P0) of the hue plane, defines the correction area Re of that hue plane. Note that the definition of the correction area Re is not limited to the ellipse.

Figure 6:
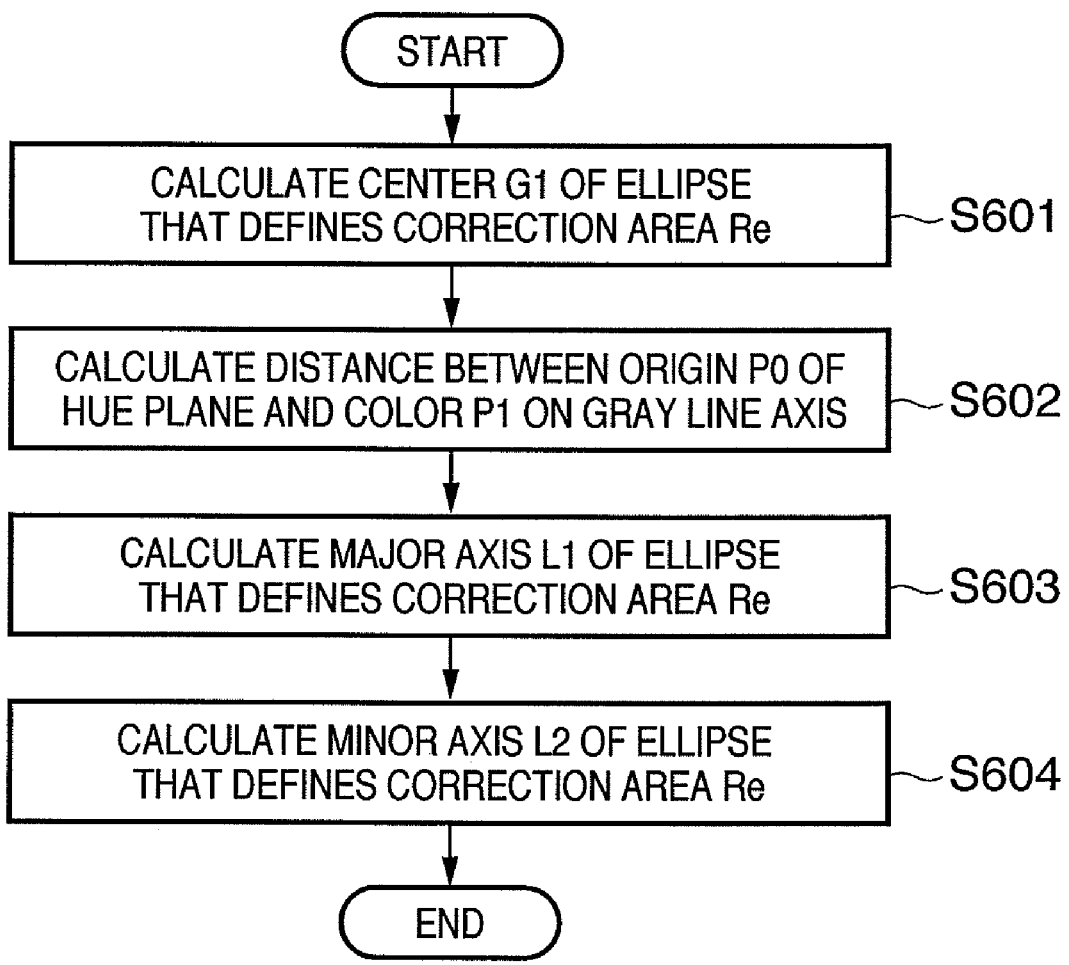
FIG. 6 is a flowchart showing details of processing for calculating a correction area.

FIG. 6 is a flowchart showing details of the processing for calculating the correction area Re. A center G1(Ga, Gb) of the ellipse that defines the correction area Re is calculated (S601) by:

$$Ga=Pa/2, Gb=Pb/2 \qquad (1)$$

where Pa and Pb are chromaticity values a and b of CIECAM02 in the color P1.

A distance E between the achromatic color P0 and color P1 is calculated (S602) by:

$$E=\sqrt{(Pa^2+Pb^2)} \qquad (2)$$

A major axis L1 of the ellipse that defines the correction area Re is calculated (S603). The major axis L1 of the ellipse is calculated using a parameter α by:

$$L1=E\times\alpha \qquad (3)$$

A minor axis L2 of the ellipse that defines the correction area Re is calculated (S604). The minor axis L2 of the ellipse is calculated using a parameter β by:

$$L2=L1\times\beta \qquad (4)$$

The parameter α is a value that satisfies $\alpha \geq 1$. If the parameter α assumes a large value, a color change in the correction area Re becomes moderate, but the range of influence of conversion broadens. Conversely, if the parameter α assumes a small value, the range of influence of conversion narrows down, but a color change in the area Re becomes steep and tone characteristics may deteriorate. The parameter β is used to determine the elliptic shape, and if β=1, the correction area Re is defined by a circle. If the parameter β assumes a large value, the range of influence of conversion broadens; otherwise, a color change in the area Re becomes steep and tone characteristics may deteriorate.

Note that the definition of the correction area Re on one hue plane has been explained. Within the range of the gray line of the printer characteristic data $Pc_1$, a required number of correction areas Re of hue planes should be defined, needless to say.

Figure 8:
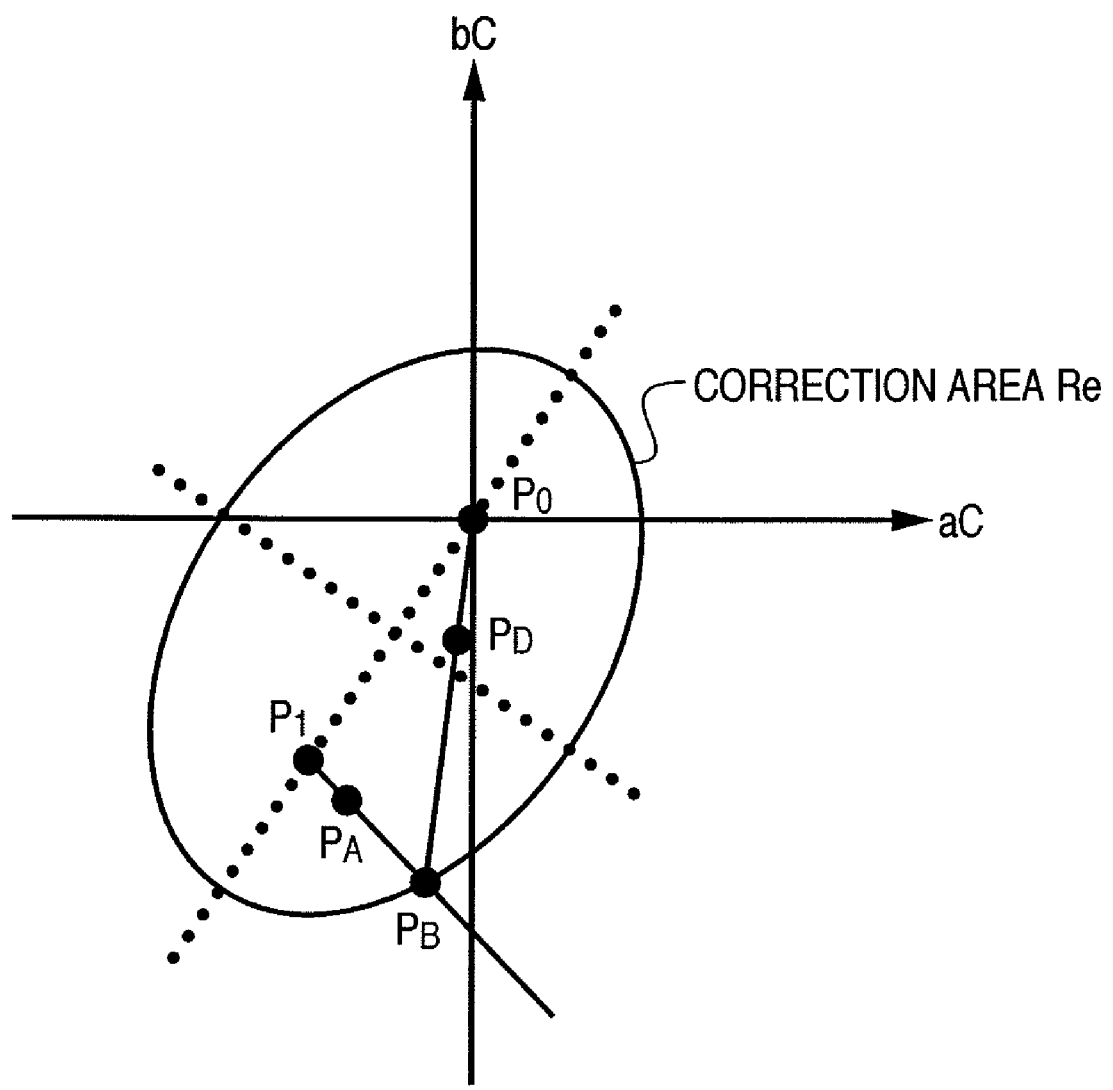
FIG. 8 is a view for explaining conversion of a gray line and its neighboring colors.

Referring back to FIG. 5, it is checked if each of the data included in the printer characteristic data $Pc_1$ indicates a color within the correction area Re defined in step S501 (S502). If each of the data included in the printer characteristic data $Pc_1$ indicates a color within the correction area, the gray line of the printer characteristic data $Pc_1$ is converted onto the lightness axis (achromatic axis), and colors in the neighborhood of the gray line undergo processing that follows this conversion (S503). With this processing, on a hue plane of a given lightness value of the CIECAM02 color space shown in FIG. 8, a color $P_A$ on a line segment $P1P_B$ is mapped onto a color $P_D$ on a line segment $P0P_B$ to have the relation given by:

$$P1P_A/P1P_B=P0P_D/P0P_B \qquad (5)$$

The processes in steps S502 and S503 are repeated for all colors (data) included in the printer characteristic data $Pc_1$ by the checking processing in step S504.

[Processing for Converting Gray Line of Target Color onto Lightness Axis (Achromatic Axis) (S406)]

Figure 7:
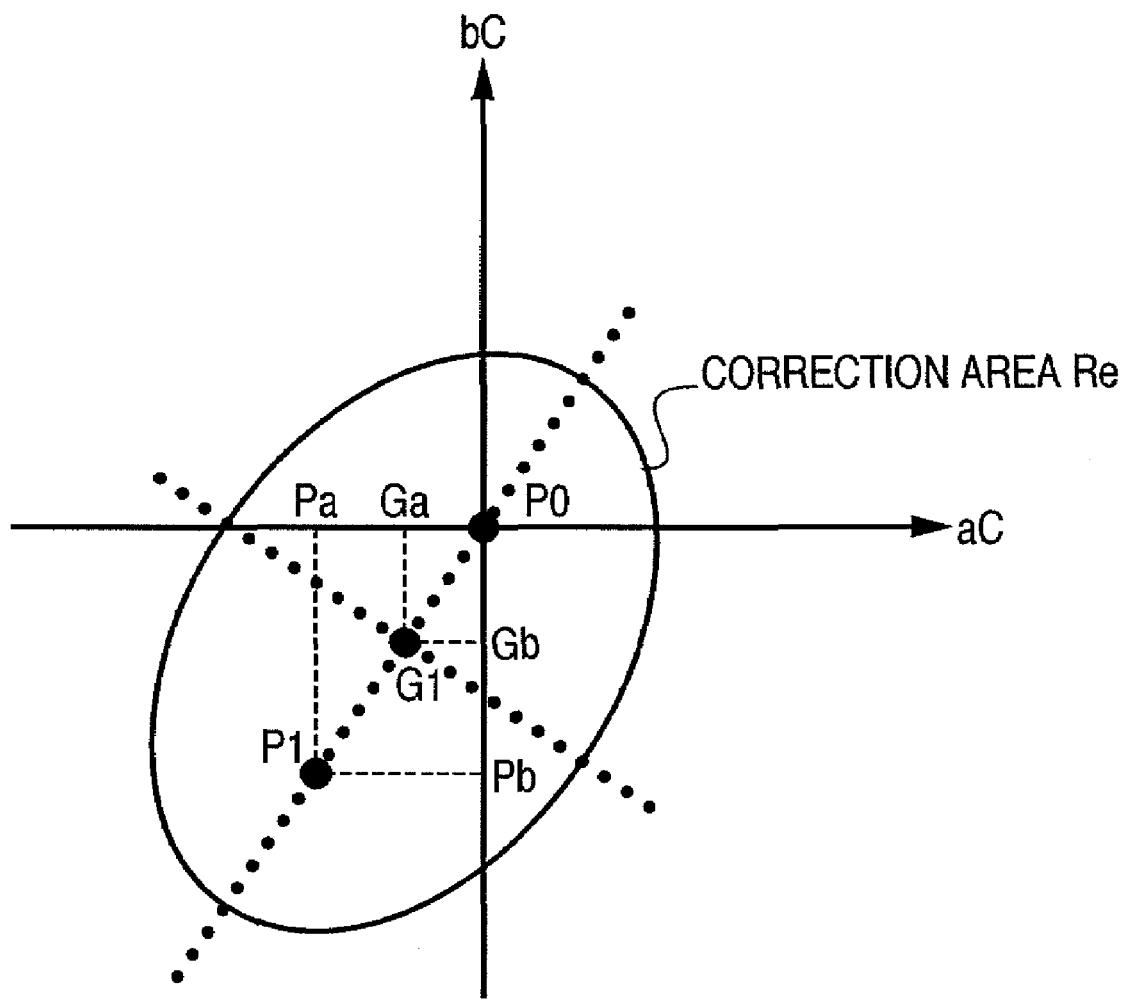
FIG. 7 is a view for explaining definition of a correction area.

Since this processing merely converts the color P1 to that on the gray line of the target color data $Tc_1$ in the processes shown in FIGS. 5 to 7 and other processes are the same as those in FIGS. 5 to 7, a detailed description thereof will be omitted.

[Gamut Mapping (S407)]

Figure 9:
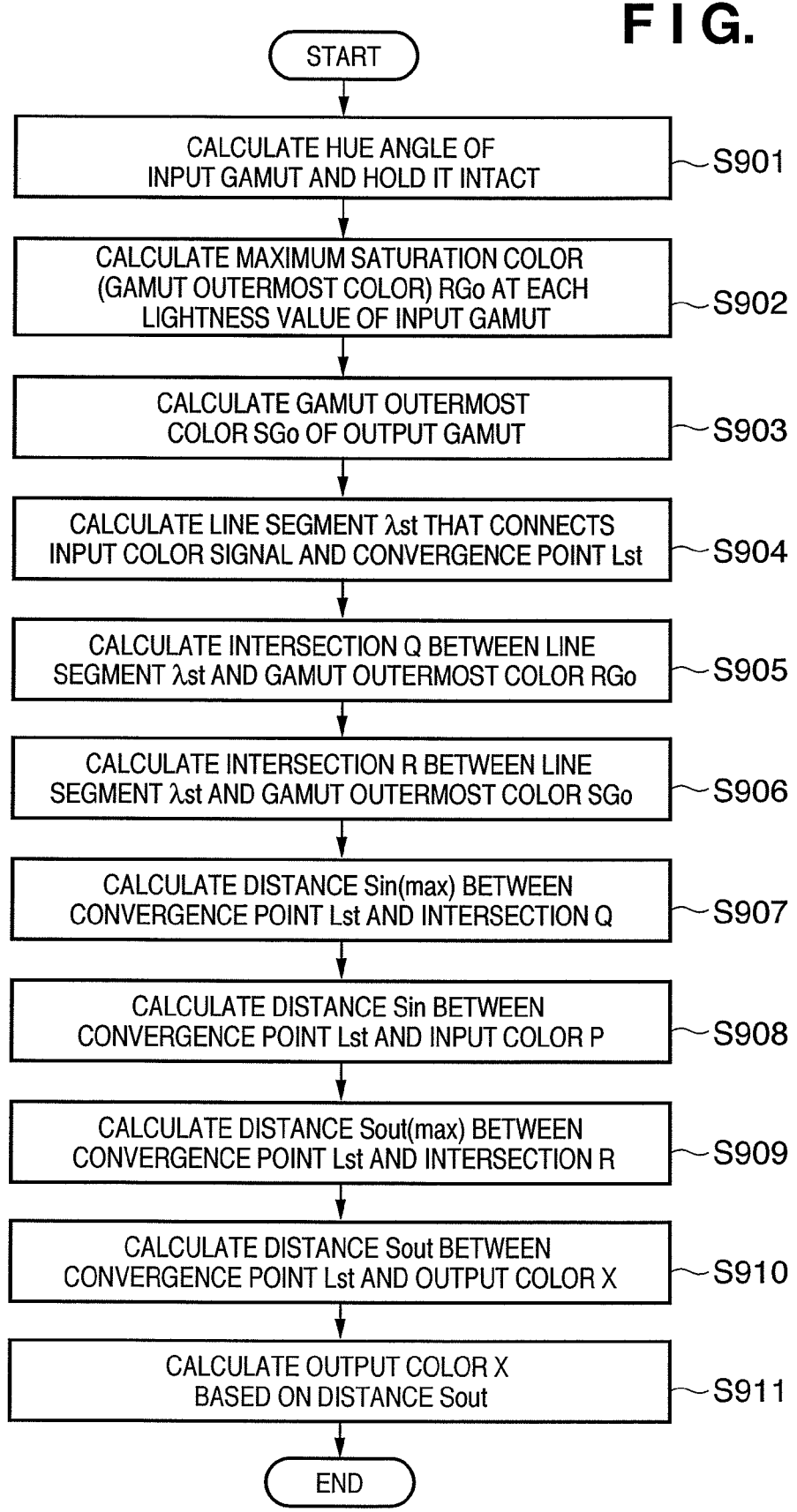
FIG. 9 is a flowchart for explaining gamut mapping for compressing the gamut of a target color to that of a printer.

FIG. 9 is a flowchart for explaining the gamut mapping which is executed by the gamut compression processor 9 and compresses the gamut indicated by the characteristic data $Tc_1'$ of the target device into that indicated by the printer characteristic data $Pc_1'$.

The hue angle of an input color signal P is calculated, and the hue angle of an input gamut is used intact as that of an output gamut (S901).

Figure 10:
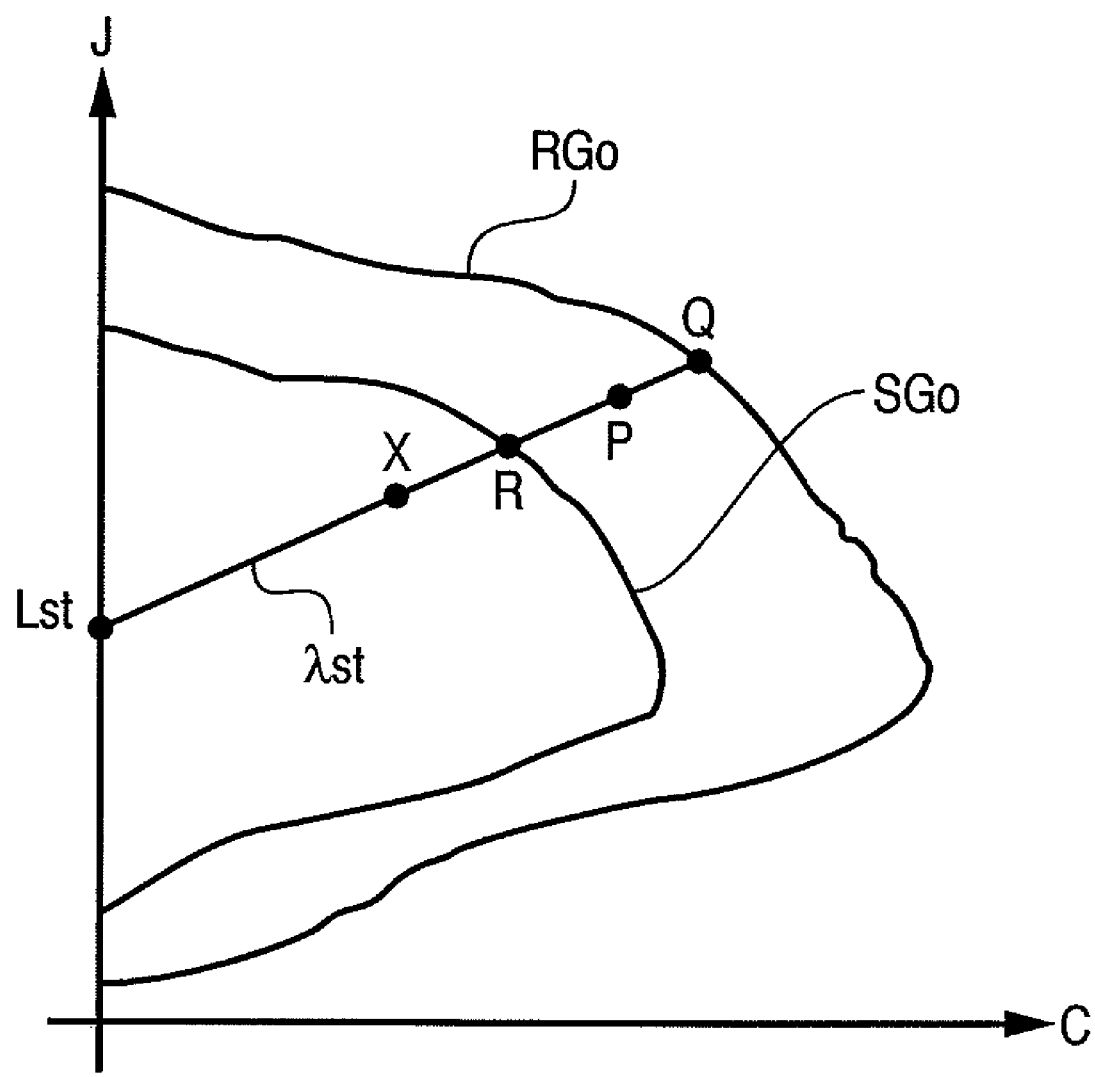
FIG. 10 is a view for explaining gamut mapping.

As shown in FIG. 10, maximum saturation colors (gamut outermost colors) RGo of the input gamut at respective lightness values are calculated (S902), and gamut outermost colors SGo of the output gamut are calculated (S903).

Next, a line segment λst which connects the input color signal P and a convergence point Lst of mapping (which is set near the center of the lightness or luminance range: for example, a 50% lightness point or the like) is calculated (S904). Also, an intersection Q between the line segment λst and the outermost color RGo of the input gamut is calculated (S905), and an intersection R between the line segment λst and the outermost color SGo of the output gamut is calculated (S906).

A distance Sin(max) between the convergence point Lst and intersection Q is calculated (S907), a distance Sin between the convergence point Lst and input color signal P is calculated (S908), and a distance Sout(max) between the convergence point Lst and intersection R is calculated (S909).

A distance Sout between the convergence point Lst and an output color signal X is calculated based on the distances Sin, Sin(max), and Sout(max) (S910), and the output color signal X is calculated based on the distance Sout (S911).

Figure 11:
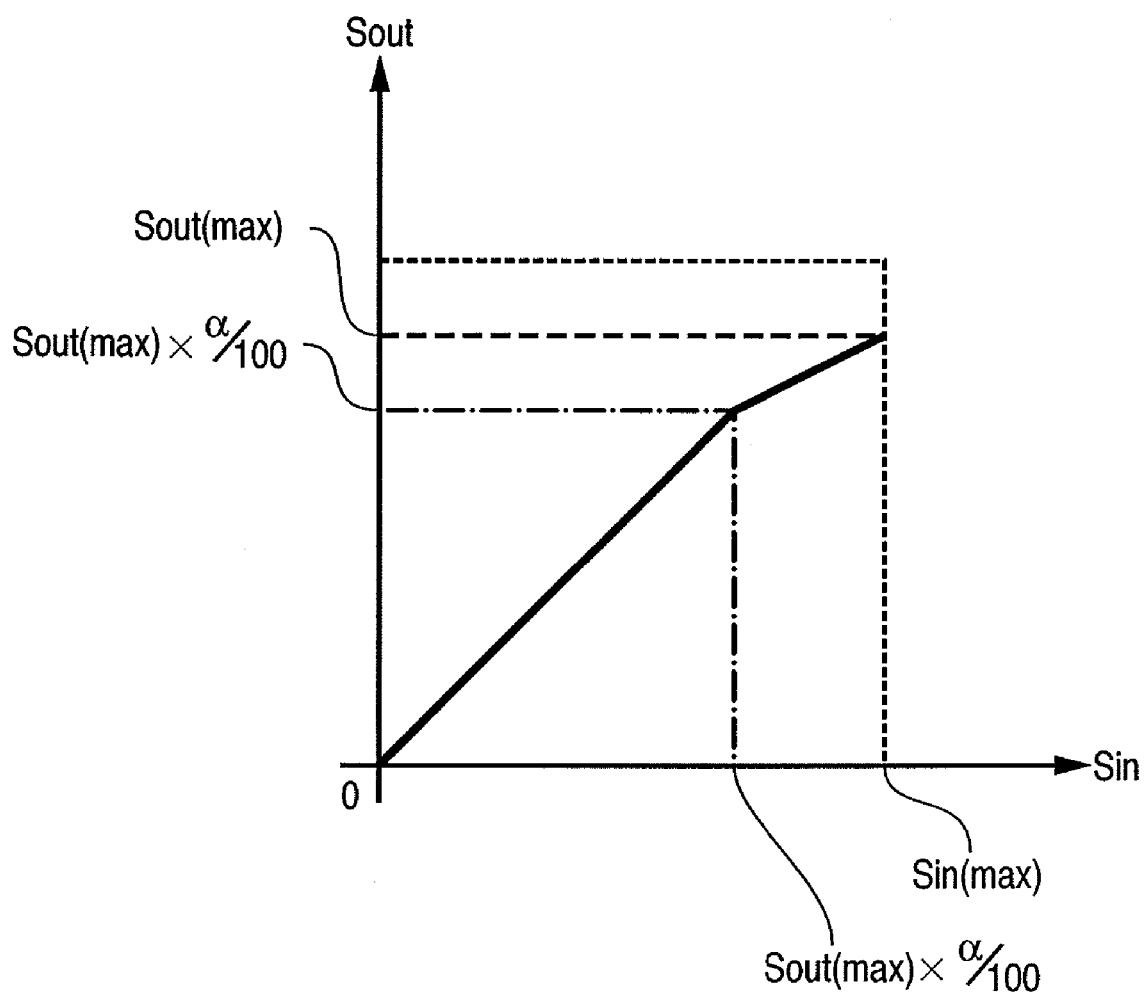
FIG. 11 is a view for explaining a saturation compression function.

FIG. 11 is a view for explaining the processing in step S910, and shows a saturation compression function that represents the relationship between the distances Sin and Sout. When the input gamut is larger than the output gamut, since an output Sout cannot directly reproduce an input Sin, as shown in FIG. 11, a saturation compression function that converts the input Sin(max) into Sout(max) is set. The saturation compression function holds the input sin until a given area (e.g., α% of Sout(max) shown in FIG. 11), and compresses saturation in a high-saturation area.

[Processing for Converting Color Corresponding to Gray Line into Favorable Gray Line of Printer (S408)]

Figure 12:
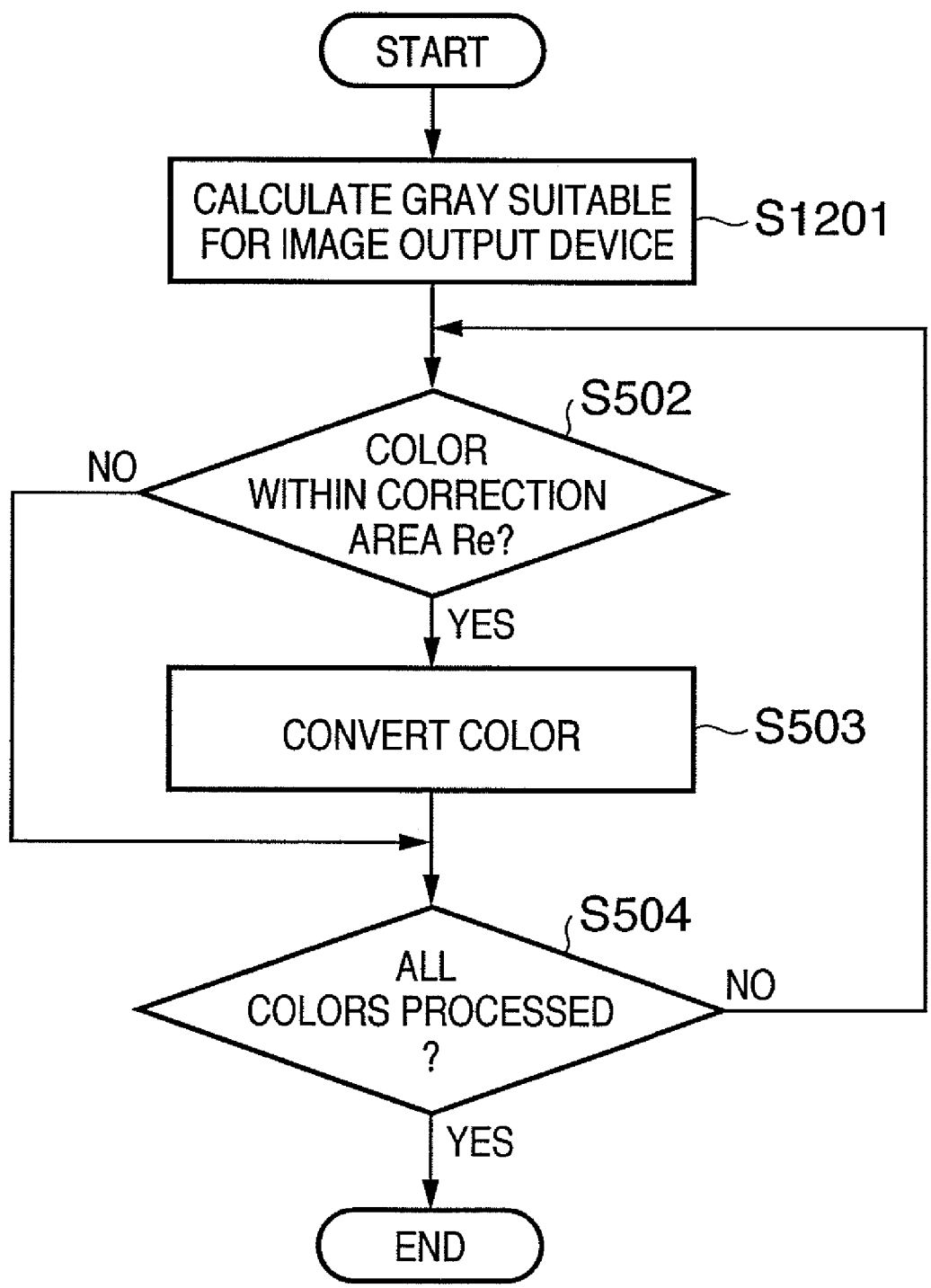
FIG. 12 is a flowchart for converting a color on the lightness axis onto a favorable gray color.

FIG. 12 is a flowchart for explaining the processing which is executed by the second gray line converter 10 and converts color signals of a gray line of mapped color signals into a favorable gray line of the printer.

The favorable gray line is a color having a favorable tint upon reproducing gray in an output image. Hence, the favorable gray line is often different from that of the device depending on the color reproduction purposes.

A favorable gray value that considers the characteristics of white and black of the image output device 3 is calculated first (S1201). Next, the same processing as in FIG. 5 is executed to have the calculated favorable gray value as P0 (origin) shown in FIG. 8 and a chromaticity point on the gray line as P1 shown in FIG. 8.

Figure 13:
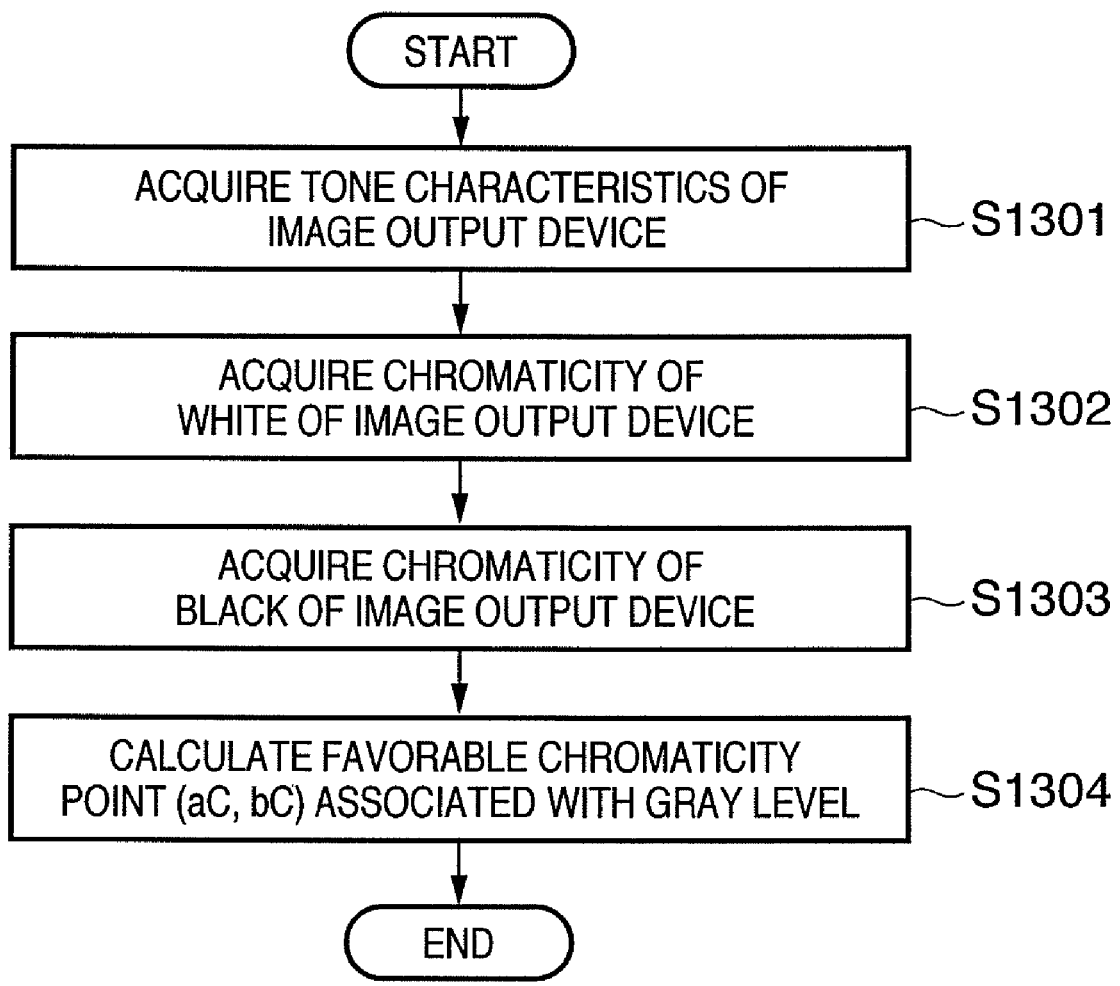
FIG. 13 is a flowchart showing processing for calculating a favorable gray color.

FIG. 13 is a flowchart showing the processing (S1201) for calculating the favorable gray color.

The gray tone characteristics of an output printer are acquired (S1301).

Gray line data are obtained, from the printer characteristic data $Pc_1$, and gray levels GL (0 to 255) in the gray line data are calculated. Each gray level data is calculated by normalizing the lightness value of each gray line data using the lightness values of white and black points of the printer characteristic data $Pc_1$.

Each gray line data is expressed by an appearance color space value, and has a lightness value (J value) and chromaticity values (ag, bg). When the printer characteristic data $Pc_1$ is expressed by the correspondence between the RGB values and appearance color space values, the gray line data are appearance color space values corresponding to R=G=B of RGB values.

A chromaticity point (aw, bw) of white (i.e., white of a print sheet to be used) of the image output device 3 is acquired (S1302). A chromaticity point (ak, bk) of black (i.e., black toner or ink as a black color former to be used) of the image output device 3 is acquired (S1303). A favorable chromaticity point (aC, bC) corresponding to each gray level is calculated (S1304), for example, using:

$0 \leq GL < 112$ (shadow area)

$aC = (ag-ak) \cdot GL/112 + ak$ $bC = (bg-bk) \cdot GL/112 + bk$ (6)

$112 \leq GL < 196$ (intermediate lightness area: set to be constant)

$aC = 0$ $bC = 0$ (7)

$196 \leq GL \leq 255$ (highlight area)

$aC = (ag-ak)(255-GL)/(255-196) + aw$ $bC = (bg-bk)(255-GL)/(255-196) + bw$ (8)

where ag and bg specify a chromaticity point on GL.

Figure 14:
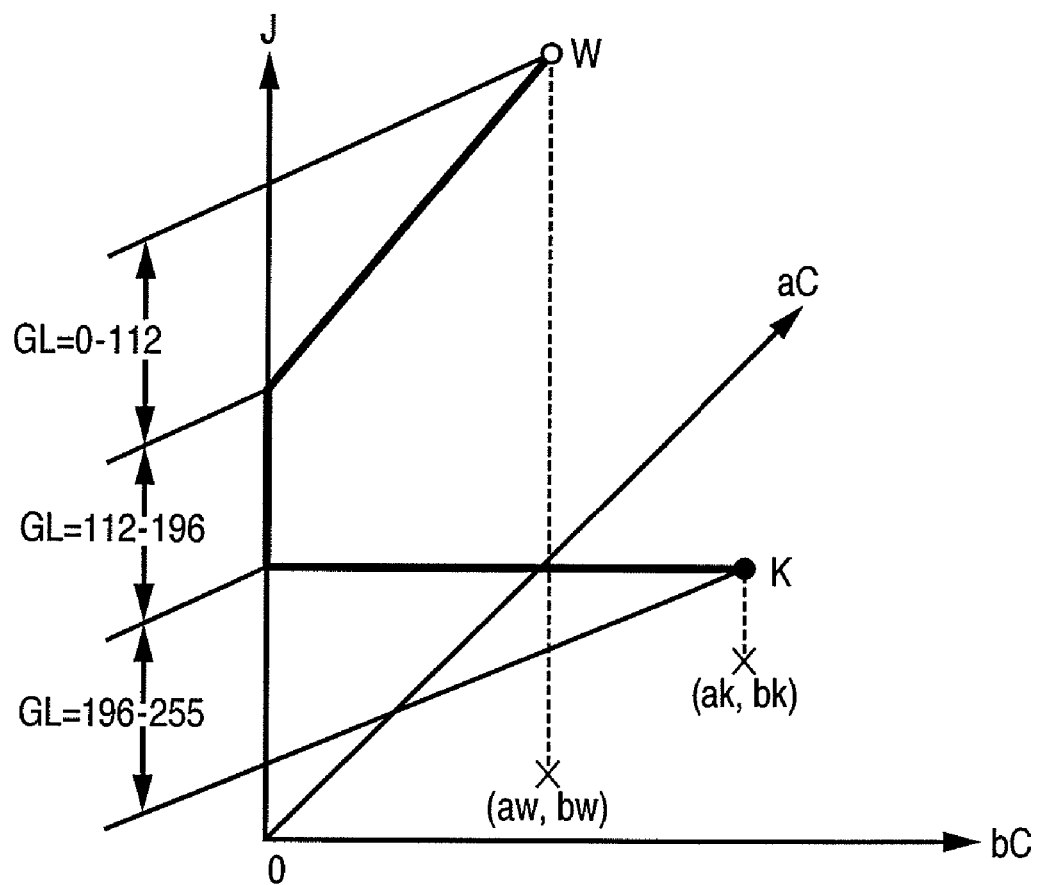
FIG. 14 is a view for explaining the favorable gray color to be calculated.

That is, as shown in FIG. 14, the saturation level (ag, bg) of the intermediate lightness area is reproduced by fixing to the chromaticity point "0" given by equations (7), and the saturation levels (ag, bg) of the highlight area and shadow area are reproduced as chromaticity points on lines that connect the chromaticity points of white and black of the image output device 3, and the chromaticity point "0" of the intermediate lightness area. Note that the range $112 \leq GL < 196$ of the intermediate lightness area is merely an example, and it is preferable to empirically set that range in correspondence with the output printer.

White depends on that of a print sheet. On the other hand, black also depends on a black color former used in the printer. By contrast, as for an intermediate lightness level, tint can be adjusted using color formers other than black. Hence, visually favorable gray is used as that of the intermediate lightness level. Furthermore, by connecting white and gray of the intermediate lightness level, and black and the intermediate lightness level to be continuously changed, the gray line in the output image can have favorable tint.

According to this embodiment, in color matching between image devices having different gamuts, gamut mapping is done after the gray line of a first image device and that of a second image device having a narrower gamut are adjusted to the achromatic axis, so as to convert mapped color signals on the gray line into those which reproduce a favorable gray color, thus implementing natural color reproduction which suffers less visual unnaturalness.

[Modification]

In the above embodiment, the chromaticity point of the intermediate lightness level is an achromatic color in CIECAM02. However, the present invention is not limited to this. The chromaticity point may be changed depending on the purpose of color conversion, needless to say.

The gamut mapping (S407) is not limited to the processing shown in FIG. 9. For example, processing for converting colors in the input gamut into those having minimum color differences within the output gamut, i.e., processing according to the required precision and the purpose of gamut mapping may be done.

The above embodiment has exemplified a case wherein the CIECAM02 color space is used in color matching between image devices having different gamuts. However, the color space is not limited to such specific color space, and color spaces such as CIECAM97s and the like according to the required precision and the purpose of color matching may be used.

The above embodiment has exemplified a case wherein color matching between the input and output devices is done. However, the above embodiment can be used in color matching between other devices.

Furthermore, the above embodiment can be applied to proofing that adjusts the color reproduction characteristics of an output device to those of a target output device. In this case, such proofing can be implemented in such a manner that color patches on a color chart printed by a target printer are measured, the calorimetric result is used as target gamut information of color reproduction (characteristic data Tc), and gamut information (characteristic data Pc) according to the image output device 3 and a print sheet is acquired from the printer profile storage unit 14.

In the above embodiment, the appearance color space is used. Alternatively, other device-independent color spaces such as uniform color spaces (e.g., CIELab) and the like may be used.

Second Embodiment

Image processing according to the second embodiment of the present invention will be described below. Note that the same reference numerals in the second embodiment denote the same components as those in the first embodiment, and a detailed description thereof will be omitted.

[System Arrangement]

Figure 15:
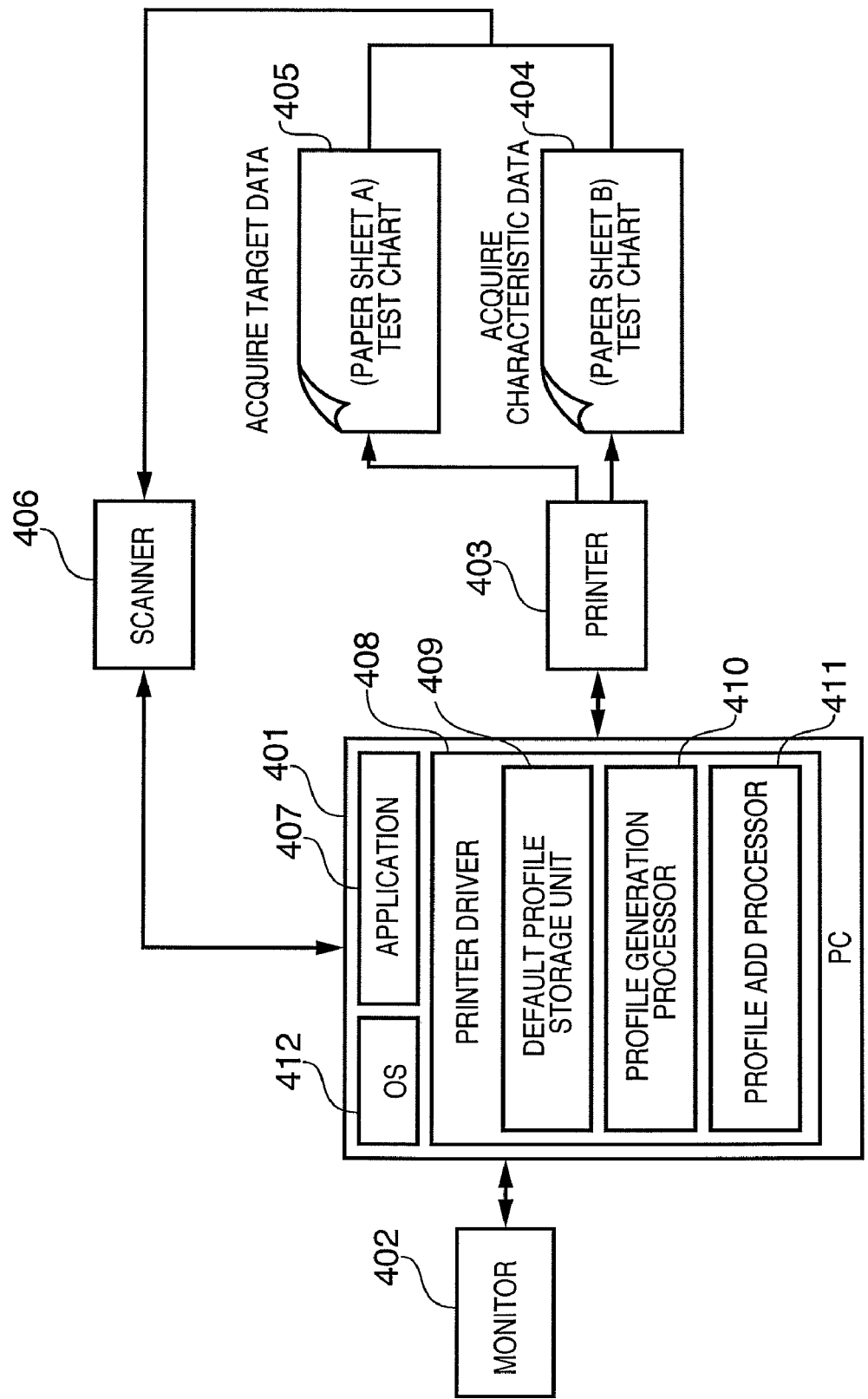
FIG. 15 is a block diagram showing the arrangement of an image processing device according to the second embodiment of the present invention.

FIG. 15 is a block diagram showing the arrangement of an image output system according to the second embodiment.

A personal computer (PC) 401 which controls the image output system scans a document image using a scanner 406 to capture its image data, displays the image on a monitor 402, and prints the image on a print sheet by a printer 403.

The PC 401 prints a test chart on a print sheet using the printer 403 so as to adjust the tint of an image to be printed. A test chart 405 shown in FIG. 15 is that which is printed on print sheet A set by the user on the printer 403, and a test chart 406 is that which is set by the user on the printer 403 and is printed on print sheet B different from print sheet A. Note that image data used to print this test chart is preferably data that allows to print data of nine RGB levels (729 colors) on one A4-size print sheet, and data which allows to acquire color reproducibility of an output environment (printer and print sheet) the user demanded.

On the PC 401, an operating system (OS) 412 runs, and an image processing application 407, a printer driver 408 that links the application 407 and printer 403, and the like run under the control of the OS 412. Although not shown, a scanner driver also runs when a document image is to be scanned.

The printer driver 408 includes a default profile storage unit 409 that stores a color conversion profile, a profile generation processor 410 that generates a profile in correspondence with the user's desire, a profile add processor 411 which stores the profile generated by the profile generation processor 410 in a memory area managed by the printer driver 408, and the like.

Note that the OS 412, application 407, printer driver 408, and the like are stored in a nonvolatile memory such as a hard disk or the like, and are loaded onto a work memory such as a RAM or the like by a CPU of the PC 401 as needed when they are executed.

[User Interface]

Figure 16:
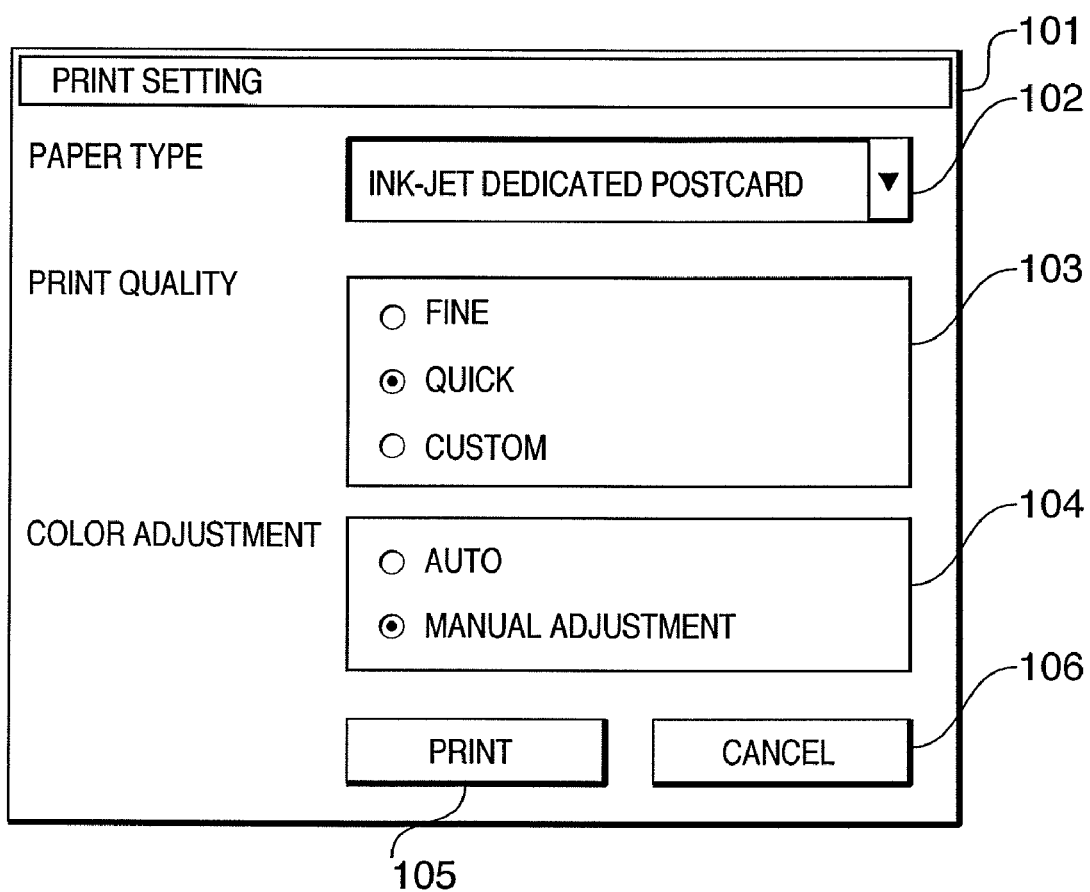
FIG. 16 is a view showing an example of a print setting dialog.

FIG. 16 shows an example of a print setting dialog 101 displayed on the monitor 402 by the printer driver 408 when the user designates "print" from a menu of the application 407.

When the user operates a pull-down menu 102 used to select the type of a print sheet, radio buttons 103 used to select print quality, and radio buttons 104 used to switch color adjustment, which are laid out on the print setting dialog 101, and clicks a "print" button 105 by a mouse or the like, he or she can print an image by the printer 403. When the user clicks a "cancel" button 106, he or she can cancel print processing.

When the user clicks the "print" button 105 while "auto" of the color adjustment radio buttons 104 is selected, the printer driver 408 converts the colors of an image into those for the printer 403 using the profile stored in the default profile storage unit 409. On the other hand, when the user clicks the "print" button 105 while "manual adjustment" of the color adjustment radio buttons 104 is selected, the printer driver 408 displays a manual color adjustment dialog 201 shown in FIG. 17 on the monitor 402.

The user can adjust the color balance by operating slider bars 202 of respective colors in a color balance setting field 208, which are laid out on the manual color adjustment dialog 201. Also, the user can set a desired matching method via a pull-down menu 203 in a matching method setting field 209. Furthermore, a check box 204 used to designate a color conversion target is prepared to realize user's desired tint. When the user checks the check box 204 used to designate a target, selection of a target using a pull-down menu 205 is enabled. The user can select the already generated profile via the pull-down menu 205, but he or she can also generate a new profile. When the user selects "new profile" and then clicks an "OK" button 206, the printer driver 408 starts processing shown in FIG. 18.

When the user clicks the "OK" button 206 while the check box 204 used to designate a target is OFF (not checked) or a given profile is selected via the pull-down menu 205 after the check box 204 is checked (ON), the processing of the printer driver 408 returns to the print setting dialog 101 in FIG. 16.

[Generation of Profile]

Figure 18:
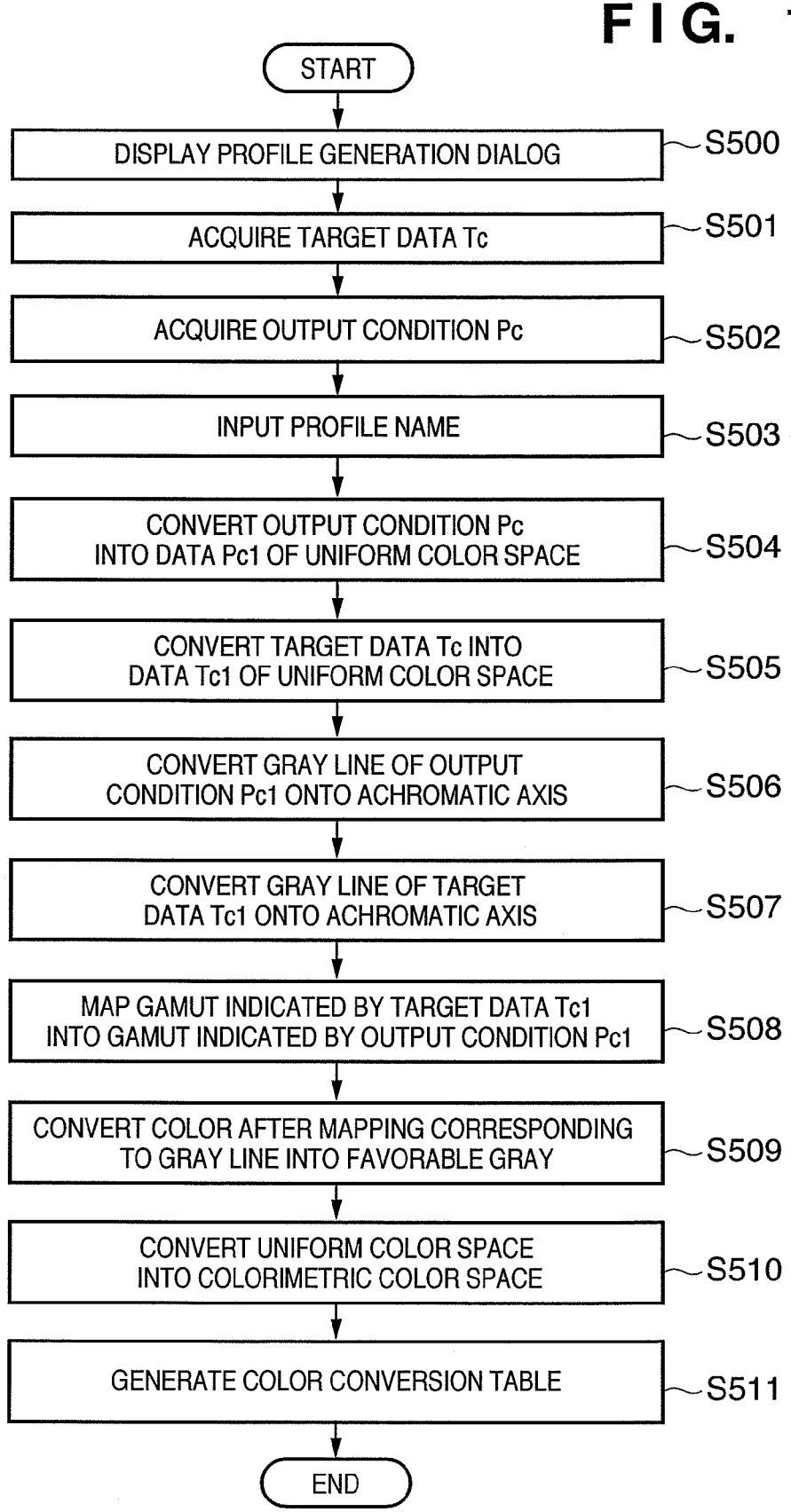
FIG. 18 is a flowchart showing profile generation processing to be executed by a profile generation processor.

FIG. 18 is a flowchart showing the profile generation processing to be executed by the profile generation processor 410.

Figure 19:
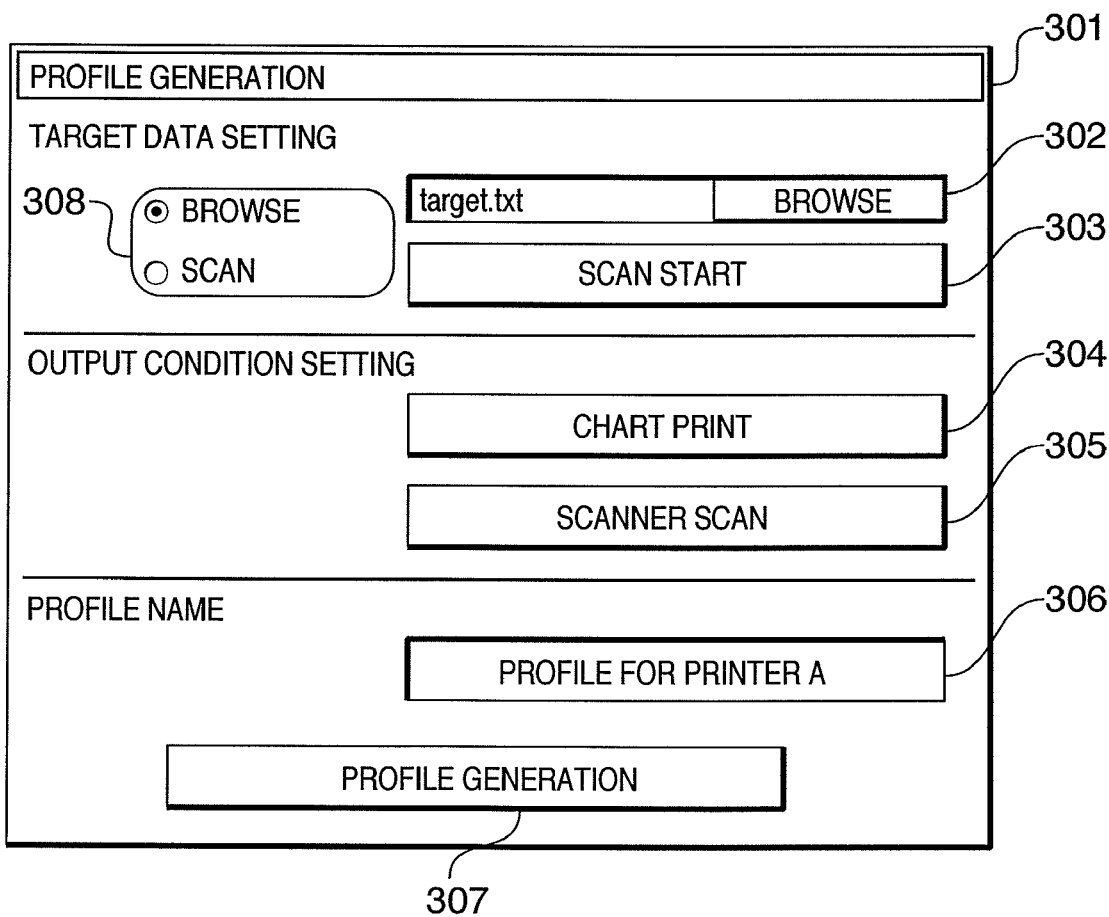
FIG. 19 is a view showing an example of a profile generation dialog.

The profile generation processor 410 displays a profile generation dialog 301 shown in FIG. 19 on the monitor 402 (S500), and acquires user's target data Tc (S501). The user designates "browse" or "scan" using radio buttons 308 for acquiring target data on the profile generation dialog 301 shown in FIG. 19. If target data Tc has already been measured (acquired) in advance, the user designates "browse" and inputs a file name of the target data Tc stored in a hard disk or the like of the PC 401 in an input field 302 or selects the corresponding file by pressing a browse button. If target data has not been acquired yet, the user designates "scan", sets a color chart of the target on the scanner 406, and then clicks a scan start button 303. The profile generation processor 410 acquires the target data by browsing it or from the scanner 406.

The color chart of the target is a chart on which patches of user's favorable colors obtained by adjusting image data of respective patches of a test chart using image retouch software are printed. In this case, the user himself or herself need not perform the adjustment, and may ask a person who is skilled in adjustment to generate a color chart of favorable colors. If color charts are prepared in correspondence with different image attributes such as photograph, graphics, business color, and the like, target data according to attributes of images to be printed can be prepared. Of course, this color chart need not be printed by the print system shown in FIG. 15 used by the user, and may be printed by another print system or a previously used printer.

The profile generation processor 410 then acquires user's output conditions Pc (S502). In order to set the output conditions Pc, the user sets a desired print sheet on the printer 403, and then clicks a "chart print" button 304. The profile generation processor 410 outputs a print command of the test chart to the printer 403, thus making it print the test chart. The user sets this test chart on the scanner 406, and then clicks a "scanner scan" button 305. The profile generation processor 410 acquires the output conditions Pc from the scanner 406.

Next, the profile generation processor 410 accepts the name (or file name) of a profile to be generated (S503). The user inputs a profile name in an input field 306. This profile name is preferably an easily identifiable one in the operation of the pull-down menu 205 used to designate a target shown in FIG. 17. If the user clicks a "profile generation" button 307 after he or she inputs the profile name, the profile generation processor 410 begins to generate a profile (color conversion table) used to perform color conversion that matches the tint (target data Tc) designated by the user under the output environment (output conditions Pc) set by the user.

Initially, the profile generation processor 410 converts the acquired output conditions Pc into data $Pc_1$ of a uniform color space using an appearance color space or the like which is approximate to the human visual sense characteristics (S504), and similarly converts the target data Tc into data $Tc_1$ of the uniform color space (S505). As an example of the appearance color space, CIECAM97s, CIECAM02, and the like may be used. In the following description, color conversion using CIECAM02 as a visually faithful color space will be exemplified. However, the present invention is not limited to such specific color space.

The profile generation processor 410 converts a gray line corresponding to color signals of R=G=B of the output conditions $Pc_1$ onto the lightness axis of the CIECAM02 color space (S506), and similarly converts a gray line corresponding to color signals of R=G=B of the target data $Tc_1$ onto the lightness axis of the CIECAM02 color space (S507).

Using the gamuts determined by the processes in steps S506 and S507, the profile generation processor 410 performs processing for mapping the gamut indicated by the target data $Tc_1$ within that indicated by the output conditions $Pc_1$ (S508). The profile generation processor 410 then converts color signals, which correspond to R=G=B (gray line) of the target data and are mapped within the gamut indicated by the output conditions $Pc_1$, into favorable gray colors according to white and black of the output conditions $Pc_1$ (S509).

The profile generation processor 410 then converts the gamut determined by the processing in step S509 from the uniform color space into a calorimetric color space (S510). The calorimetric color space means, for example, a color space such as CIELAB or the like. Finally, the profile generation processor 410 generates a color conversion table based on the correspondence between the color signals RGB and colorimetric values obtained by the processes until step S510, and the output conditions Pc acquired in step S502 (S511).

Figure 17:
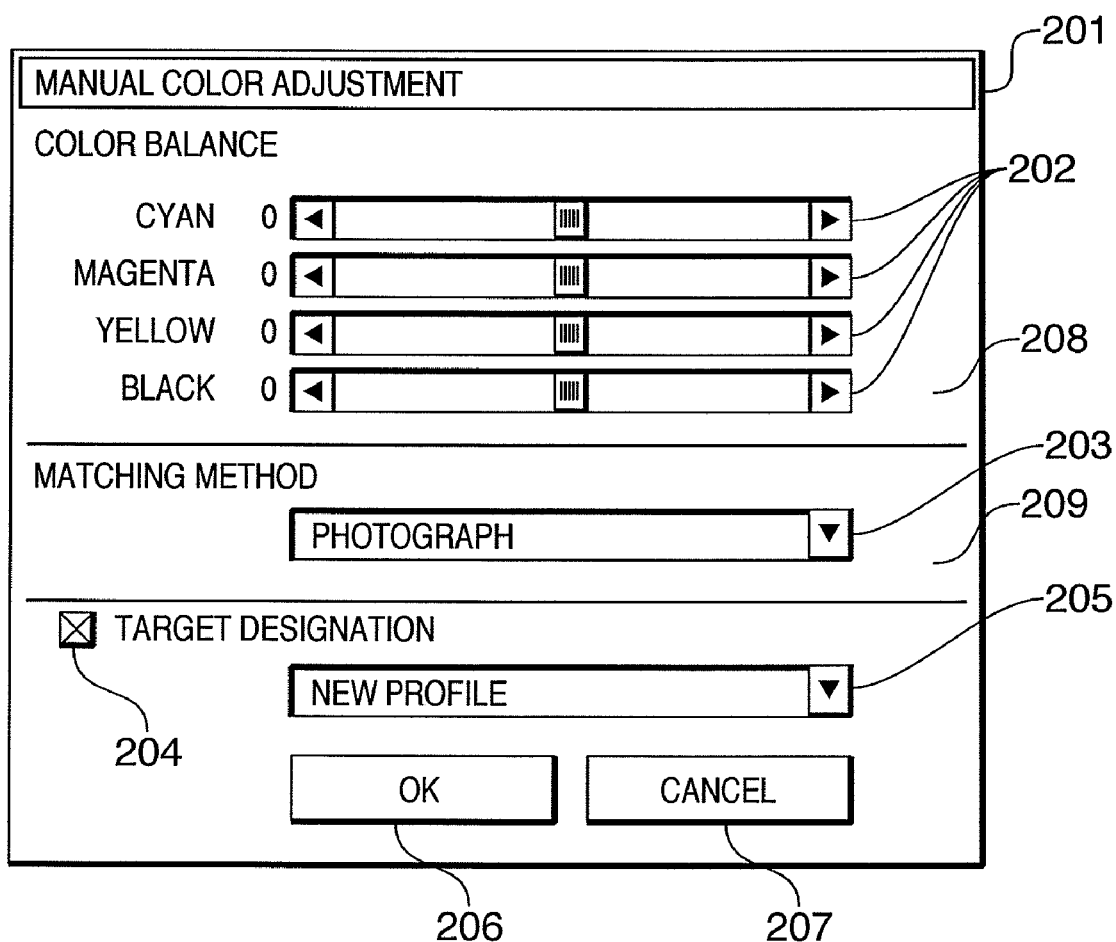
FIG. 17 is a view showing an example of a manual color adjustment dialog.

The color conversion table (profile) generated in this way is stored by the profile add processor 411 in the memory area managed by the printer driver 408, and can be designated (selected) via the pull-down menu 205 used to designate a target shown in FIG. 17.

[Modification]

Figure 20:
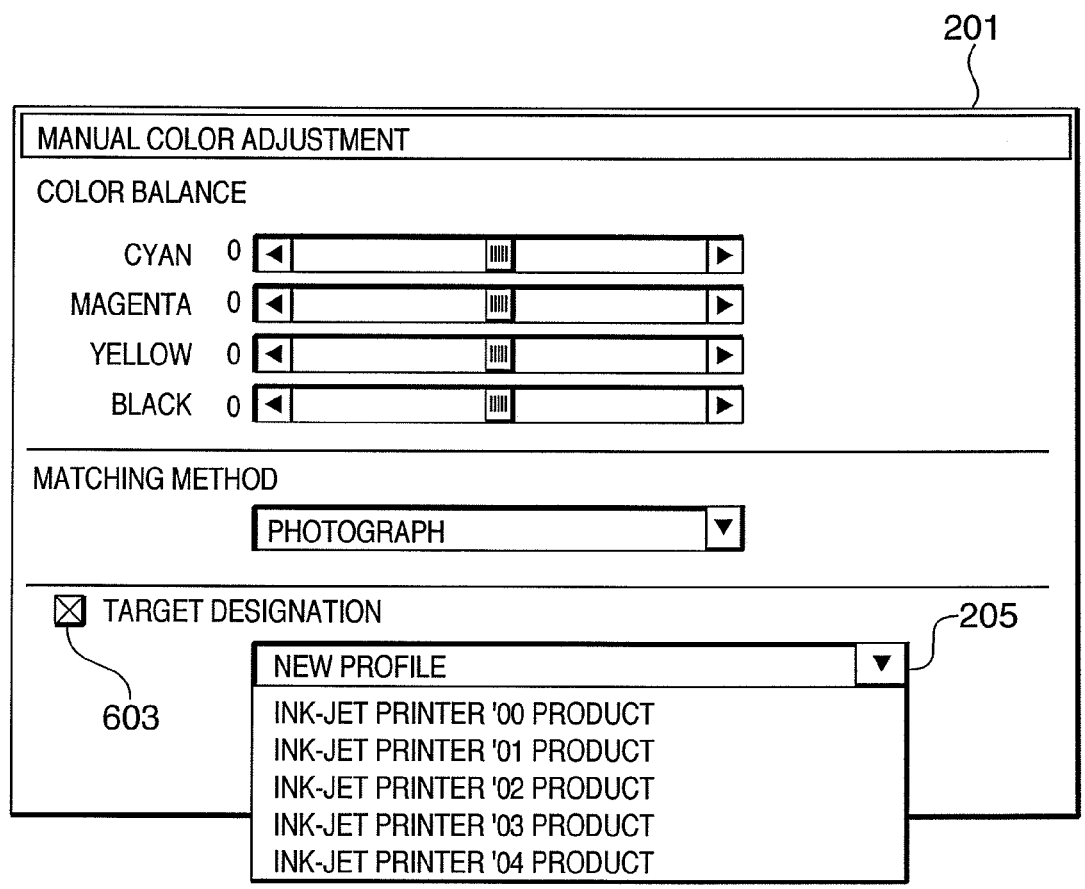
FIG. 20 is a view showing the second example of a manual color adjustment dialog.

As shown in FIG. 20, the printer driver 408 can store profiles corresponding to printer models as those which can be selected from the pull-down menu 205 on the manual color adjustment dialog 201. In this way, when a printer model is changed due to failures or updating of functions of a printer, a change in tint of an output image can be minimized by designating a profile corresponding to the previously used printer model as target data. It is particularly effective to store profiles of printer models whose manufacture or sales has been terminated.

In conversion associated with the gray line in the second embodiment, not only colors on the gray line but also those near the gray line are preferably converted as in the first embodiment.

As described above, in an arbitrary printer environment (the printer model to be used and the type of a print sheet to be used), the load on the user who must adjust tint by repetition of trial and error until a printed matter with a desired tint is obtained can be avoided, and the tint the user wants can be easily realized.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-026882, filed Feb. 2, 2005, which is hereby incorporated by reference herein in its entirety.

What is claimed is:

1. A color processing method of mapping an input color within a first gamut to an output color within a second gamut, comprising the steps of:
    acquiring first gamut information of the first gamut and second gamut information of the second gamut;
    setting a first correction area based on a first gray line corresponding to the first gamut information and an achromatic axis, and setting a second correction area based on a second gray line corresponding to the second gamut information and the achromatic axis;
    setting a favorable gray line based on chromaticity of a white and black corresponding to the second gamut information, and predetermined chromaticity of intermediate lightness;
    converting first color signals in the first correction area to match the first gray line with the achromatic axis, and converting second color signals in the second correction area to match the second gray line with the achromatic axis;
    mapping a first converted gamut based on the converted first color signals to a second converted gamut based on the converted second signals; and
    converting a gray line of the gamut mapped from the first converted gamut to match the favorable gray line.

2. The method according to claim 1, wherein the achromatic axis is an achromatic axis in an appearance color space which does not depend on a light source condition.

3. The method according to claim 1, further comprising the steps of:
    selecting target information from a plurality of pieces of target color information which are held; and
    calculating the first gamut information based on the selected target information.

4. The method according to claim 1, wherein the first and second correction areas are each obtained for each lightness level.

5. The method according to claim 1, wherein the first and second correction areas each have an elliptic shape.

6. A computer-readable storage medium storing a computer-executable comprising program for causing a computer to perform a color processing method of mapping an input color within a first gamut to an output color within a second gamut, said method comprising the steps of:
    acquiring first gamut information of the first gamut and second gamut information of the second gamut;
    setting a first correction area based on a first gray line corresponding to the first gamut information and an achromatic axis, and setting a second correction area based on a second gray line corresponding to the second gamut information and the achromatic axis;
    setting a favorable gray line based on chromaticity of a white and black corresponding to the second gamut information, and predetermined chromaticity of intermediate lightness;
    converting first color signals in the first correction area to match the first gray line with the achromatic axis, and converting second color signals in the second correction area to match the second gray line with the achromatic axis;
    mapping a first converted gamut based on the converted first color signals to a second converted gamut based on the converted second signals; and
    converting a gray line of the gamut mapped from the first converted gamut to match the favorable gray line.

7. A color processing apparatus for mapping an input color within a first gamut to an output color within a second gamut, comprising:
    an acquisition section, arranged to acquire first gamut information of the first gamut, and to acquire second gamut information of the second gamut;
    a setting section, arranged to set a first correction area based on a first gray line corresponding to the first gamut information and an achromatic axis, to set a second correction area based on a second gray line corresponding to the second gamut information and the achromatic axis, and to set a favorable gray line based on chromaticity of a white and black corresponding to the second gamut information and predetermined chromaticity of intermediate lightness;
    a first converter, arranged to convert first color signals in the first correction area to match the first gray line with the achromatic axis, and second color signals in the second correction area to match the second gray line with the achromatic axis;
    a mapping section, arranged to map a first converted gamut based on the converted first color signals to a second converted gamut based on the converted second signals; and
    a second converter, arranged to convert a gray line of the gamut mapped from the first converted gamut to match the favorable gray line.

* * * * *